United States Patent [19]

Elofson et al.

[11] 4,142,993

[45] Mar. 6, 1979

[54] TRANSITION METAL CATALYST

[75] Inventors: Richard M. Elofson, Edmonton; Fahmi F. Gadallah, Winterburn, both of Canada

[73] Assignee: The Research Council of Alberta, Edmonton, Canada

[21] Appl. No.: 858,120

[22] Filed: Dec. 7, 1977

[51] Int. Cl.$^2$ .......................... B01J 21/18; C01C 1/04
[52] U.S. Cl. ..................................... 252/447; 252/444; 252/421; 260/449 R; 260/449 M; 260/668 R; 423/363
[58] Field of Search ................ 252/447, 444; 423/363; 260/449 R

[56] References Cited

U.S. PATENT DOCUMENTS

| | | | |
|---|---|---|---|
| 1,119,534 | 12/1914 | Pier | 423/363 |
| 3,770,658 | 11/1973 | Ozaki et al. | 423/363 |

FOREIGN PATENT DOCUMENTS

| | | | |
|---|---|---|---|
| 2538346 | 3/1976 | Fed. Rep. of Germany | 252/447 |
| 214 of | 1915 | United Kingdom | 423/363 |

*Primary Examiner*—Winston A. Douglas
*Assistant Examiner*—P. E. Konopka

*Attorney, Agent, or Firm*—Ernest Peter Johnson

[57] ABSTRACT

A transition metal catalyst suitable for use in the synthesis of ammonia is produced by doping an activated carbon support material with a solution of an alkaline earth metal compound, a solution of a compound of a transition metal from Group VIII and a solution of an alkali metal compound. Each doping is performed separately; the product of each step is baked to obtain a catalyst having a black and lustrous surface. The doping and the baking operations are preferably conducted under vacuum.

The catalyst is preferably prepared with barium as the alkaline earth metal, ruthenium as the transition metal and potassium as the alkali metal. The activated carbon support material can additionally be doped with a solution of a compound of a lanthanide metal and/or a solution of a compound of a Group IIIA metal.

The present family of catalysts provides good ammonia yields in the fixation of nitrogen at temperatures as low as 375° C. and at pressures ranging from 27 – 67 atmospheres. The activity of these catalysts drops in the presence of carbon monoxide but returns to substantially the initial activity when the carbon monoxide is removed from the reactant stream.

23 Claims, 2 Drawing Figures

TRANSITION METAL CATALYST

BACKGROUND OF THE INVENTION

This invention relates to a method of preparing a transition metal catalyst for use in the synthesis of ammonia and to the novel transition metal catalyst obtained by practice of the invention.

In the Haber-Bosch process, nitrogen and hydrogen gas are reacted in the presence of an iron catalyst to produce ammonia, according to reaction (1).

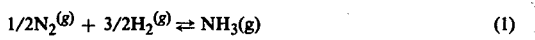

$$1/2 N_2^{(g)} + 3/2 H_2^{(g)} \rightleftharpoons NH_3(g) \qquad (1)$$

The forward reaction, which is exothermic, is increasingly favored as the temperature is reduced. The yield is also increased by increasing the pressure. Therefore, it is desirable to perform the reaction at low temperatures and high pressures.

In common practice, the reaction is performed in a high pressure vessel wherein the catalyst is provided in a basket such as to allow the reaction gases to percolate through the catalyst. In order to maintain the reaction temperature constant, the catalyst bed has to be cooled.

The catalyst most commonly used in the industrial production of ammonia is composed predominantly of magnetite ($FeO \cdot Fe_2O_3$) wherein other oxides may be present in trace amounts. Promotors are usually added to increase the activity of the catalyst. These compounds are oxides, isomorphous with $FeO$ or $Fe_2O_3$, bearing a metal similar in molecular volume to iron; for example, $MnO$, $MgO$, $ZnO$, $Cr_2O_3$, in combination with $K_2O$ and $Al_2O_3$. Prior to use, the iron catalyst must be activated by reducing it to metallic iron, usually by heating under a stream of hydrogen gas. During this process, cavities are formed in the original oxide lattice resulting in an increase in the surface area. The surface area of such a catalyst is usually in the range of 4–15 $m^2/g$ of catalyst. The promoters do not undergo reduction in this process. An iron catalyst produces a yield of approximately 12% ammonia under typical reaction conditions of about 525° C. and 150 atmospheres at a space velocity of 20,000 v/v.

SUMMARY OF THE INVENTION

The object of the present invention is to provide a transition metal catalyst suitable for use in the Synthesis Ammonia which preferably is operative both at lower reaction temperatures and lower pressures without a reduction in the yield of ammonia. The provision of such a catalyst can lead to savings in capital equipment. Also, operational difficulties along with energy requirements may be substantially reduced.

Some of the catalysts of the present invention give good yields at temperatures as low as 375° C. and at pressures ranging from 27–67 atmospheres.

In accordance with the invention, an activated carbon support is doped with a series of solutions. These are solutions of an alkaline earth metal compound, of a compound of a transition metal from Group VIII, and of an alkali metal compound. Each doping is performed separately; the preferred sequence chosen for doping effects the specificity and the activity of the catalyst.

Although the activity of the present family of catalysts toward nitrogen fixation drops in the presence of significant amounts of carbon monoxide, for example 1% in the gas stream, the activity is recovered when carbon monoxide is eliminated. Therefore, the presence of carbon monoxide acts to inhibit the catalyst rather than to poison it.

The transition metal in the new family of catalysts can be recovered and reused in doping. This means that after the initial cost of the catalyst, regeneration, if necessary, is relatively inexpensive.

Since the present family of catalysts performs under moderate temperatures and pressures and is less susceptible to poisoning by carbon monoxide or water vapor, it is expected that equipment break-downs would be less frequent than in the case of a prior commercial catalyst which performs under higher pressures and temperatures. Therefore the overall maintenance cost would be expected to drop considerably.

Broadly stated, the invention relates to a method for preparing a transition metal catalyst comprising doping an activated carbon support material with in sequence a solution of an alkaline earth metal compound, a solution of a compound of a transition metal from Group VIII, and a solution of an alkali metal compound. The invention also comprises a transition metal catalyst comprising an activated carbon support material associated with an alkaline earth metal, a transition metal from Group VIII and an alkali metal.

DESCRIPTION OF THE PREFERRED EMBODIMENT

Figure 1:
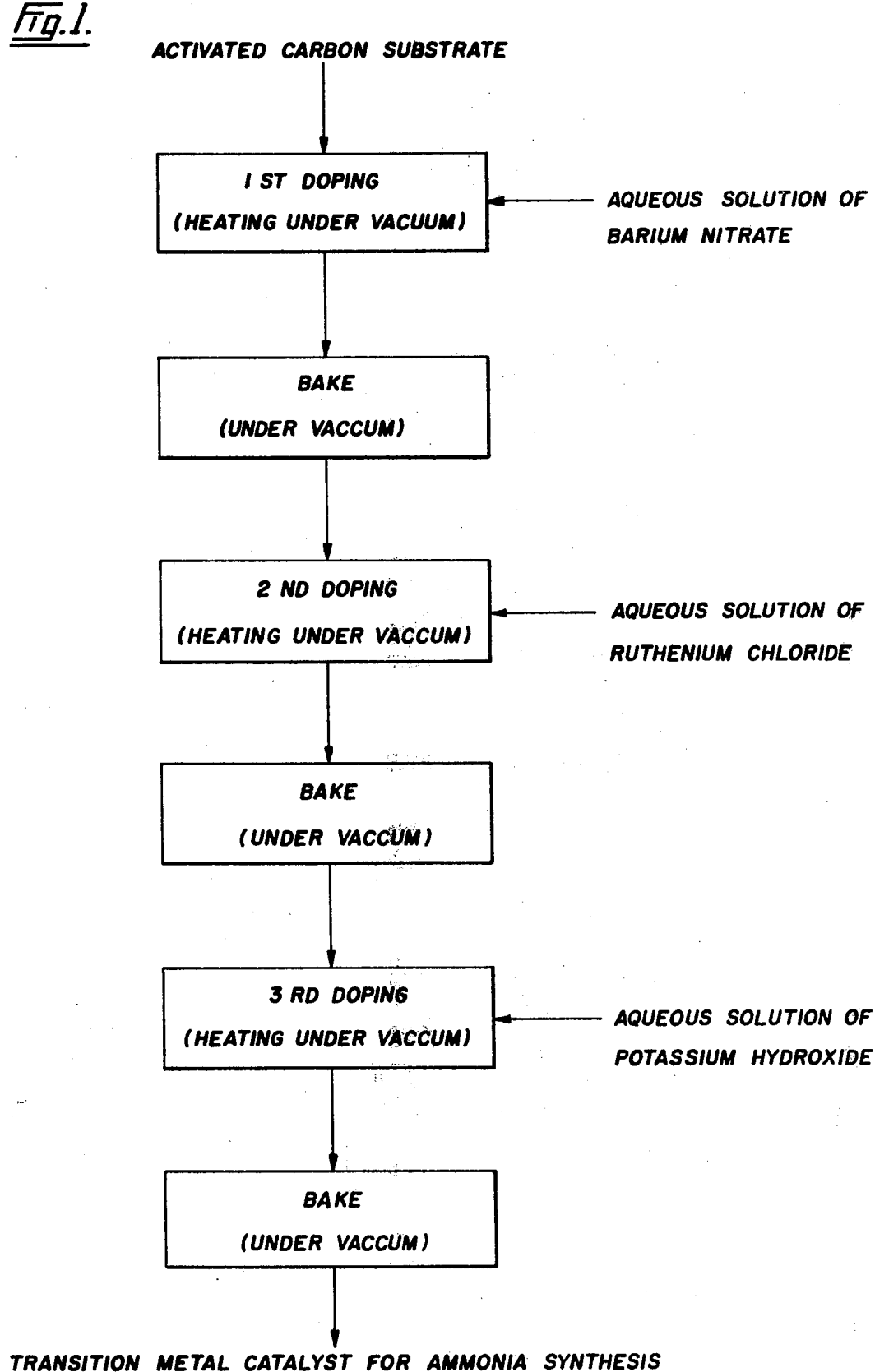
FIG. 1 is a block diagram outlining the steps of the process.

The present family of catalysts was prepared by doping the carbonaceous support material with the salt of an alkaline earth metal, preferably barium (1–8% by weight), followed by a salt of a transition metal from Group VIII, preferably ruthenium (0.1–4% by weight), and followed, in turn, by a compound of an alkali metal, preferably potassium (5–20% by weight). In addition to these, the catalyst can be doped with the salt of lanthanide metal, preferably lanthanum (0.5–6% by weight), and/or the salt of a metal from Group IIIA, preferably aluminum (0.5–5% by weight). The catalyst is preferably doped with the lanthanide metal compound before being doped with the transition metal compound.

Potassium is preferably applied as potassium hydroxide or carbonate; the alkaline earth metal is preferably applied as a nitrate. Not all salts are suitable as some anions, such as chloride, have a poisoning effect on the catalyst. A water soluble salt of the transition metal should be selected.

Doping may be performed in accordance with the following preferred technique: sufficient aqueous solution of a compound bearing the desired metal is poured over the degassed support material to cover it completely. The slurry is then heated under vacuum until all the water has evaporated. The doped material is then, preferably, baked, for example at 250° C. for 3–5 hours, and cooled. This process is repeated for each metal required in the catalyst.

The invention is illustrated by the following examples:

EXAMPLE I

Although a commercially available form of activated carbon may be used as the support material, we prepared our own for subsequent doping. The basic materials which were used were hardwood, either maple or birch, polyvinyledene chloride, and cellulose.

In this example, hardwood was cut into small pieces, one-inch squares. The cuts were enclosed in a stainless steel beaker which was, in turn, placed in an oven and flushed with nitrogen for 2 hours. The temperature was slowly raised to a charring temperature of 600° C. at the rate of 1-2° C./min. in order to avoid cracking of the wood. The char was kept at 600° and under a nitrogen atmosphere for three hours, a sufficient time to ensure uniform heat distribution and charring. This process resulted in about 75% loss in weight of the starting material.

The char was then broken to a size of 7-16 mesh and activated in a fluidized bed by a mixture of steam and air, at 850-900° C. for 5 hours. The loss in weight of the char during this step was approximately 50%. The char could alternately be activated in a stream of carbon dioxide.

The activated carbon was then placed in a container and degassed under vacuum (70-100 microns) and at a temperature of 220-250° C. for a minimum of 8 hours. It was then cooled and an aqueous solution of barium nitrate, 2% in barium, by weight of the carbon, was added under vacuum in an amount sufficient to cover the activated carbon. The slurry was then heated under vacuum until all the water had evaporated. The product was then baked under vacuum at 250° C. for four hours and cooled.

An aqueous solution of $RuCl_3.3H_2O$, 4% in ruthenium, by weight of the support, was added under vacuum to the above product. It has been previously stated that chlorides exhibit a poisoning effect on the catalyst, however, ruthenium chloride was used due to its greater stability over other ruthenium salts. This is important in obtaining a uniform coating of the carbon support. The doped support was then baked under vacuum at 250° C. for four hours and cooled. The process was repeated a third time by doping and baking as previously described with an aqueous solution of potassium hydroxide, 12% in potassium by weight of the support.

From hereonin, let it be understood that all percentages refer to % by weight of the support unless otherwise specified.

It appears that the activity of the catalyst increases if each salt is added separately and under vacuum, and if the doped material is baked. Baking acts to convert the salts of the doping solution to their respective oxides and apparently produces a better surface covering on the carbon support.

The resulting surface of the catalyst was black and lustrous and gave no indication of any precipitated salts. The catalyst displayed a surface area of about 850-950 $m^2/g$. It could be stored under ambient conditions.

Prior to use, the catalyst was degassed under vacuum for 6 hours, and activated with hydrogen at 400° C. and 15 atmospheres for 24 hours.

Figure 2:
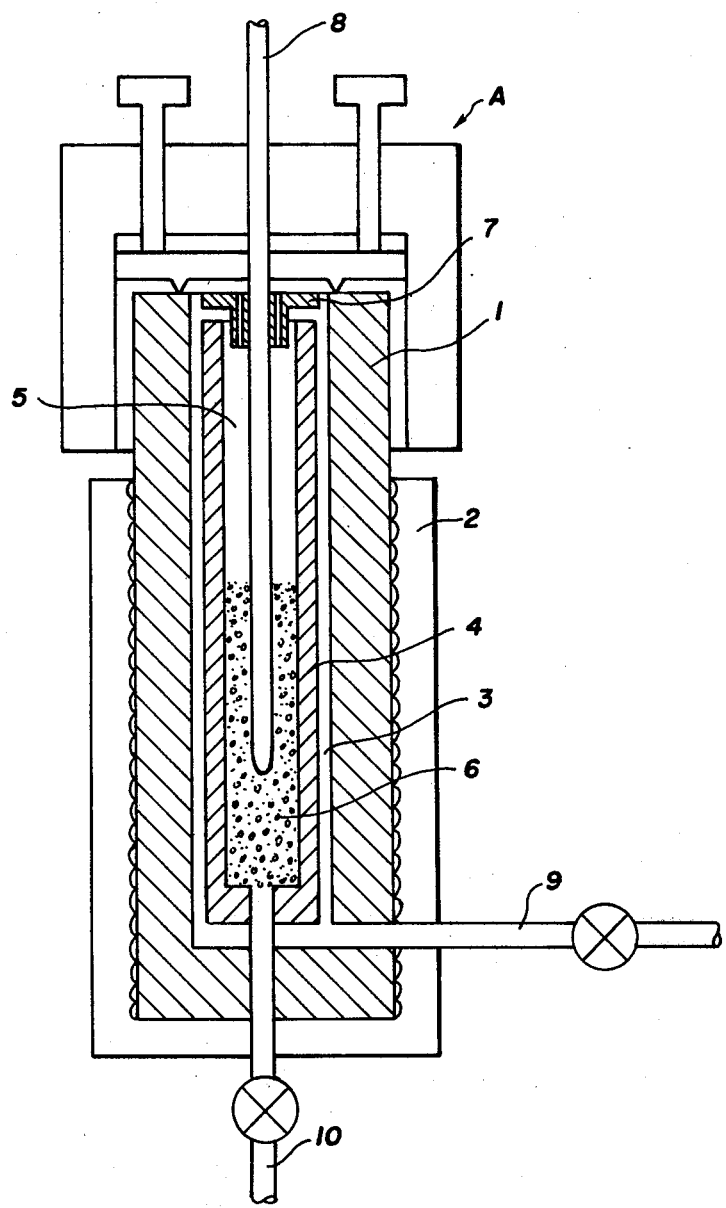
FIG. 2 is a cross section of a laboratory-scale test reactor used in developing the invention.

The catalyst was tested in a stainless steel, double-walled laboratory reactor shown in FIG. 2. The outer wall 1 of the reactor was wrapped in a heating tape 2. An annular space 3 was formed between the outer wall 1 and the inner wall 4. The inner wall 4 defined an inner cavity 5 which was packed with 1 gram of the catalyst 6, this being a representative sample. The inner cavity 5 was then covered with a perforated cap 7 through which a thermocouple 8 could be fitted. Reactant gases, hydrogen and nitrogen in the mole ratio of 3 to 1, were fed in through an inlet 9, near the bottom of the reactor, at a space velocity of 3000, i.e. 3000 volumes of gas feed per volume of catalyst per hour. The gases flowed upwards through the annular space 3, passed into the inner cavity 5 through the perforated cap 7 and percolated downwards through the catalyst 6 where they reacted to form ammonia. The reaction temperature and pressure were kept at 400° C. and 50 atmospheres. The effluent gases were carried out of the reactor through an outlet 10. These effluent gases consisted of unreacted nitrogen and hydrogen, and of ammonia, the reaction product. The ammonia was trapped in a solution of sulfuric acid of known concentration which was then titrated. It was found that 9.6% of the total gas feed was converted to ammonia. This yield is about 61% of the equilibrium yield at these particular reaction conditions.

An absolute yield, $Y_{abs}$, can be calculated by taking the quotient of the moles of ammonia produced to the sum of the moles of the nitrogen and hydrogen passed through the reactor.

$$Y_{abs} = \frac{\text{moles } NH_3}{\text{moles } (N_2 + H_2)} \qquad (2)$$

The efficiency of the catalyst is given by the ratio of the actual mole percent ammonia in the effluent to the mole percent of ammonia at equilibrium under the same reaction conditions. The absolute yield is more helpful towards establishing desirable reaction conditions as it relates the amount of ammonia produced to the composition of the reactant gases, while the efficiency compares the actual yield to the equilibrium yield, a quantity which varies with the reaction conditions.

EXAMPLE 2

A one gram sample of a catalyst made in accordance with the method of Example 1 of active carbon charred to 800° C. (7-16 mesh); barium nitrate, 4% in barium; aluminum nitrate - 9 - hydrate, 1% in aluminum; ruthenium chloride tri-hydrate, 4% in ruthenium; and potassium hydroxide, 14% in potassium, was placed in a stainless steel reactor. The catalyst was degassed under vacuum (70-100 microns) at 300° C. for 24 hours. The hydrogen flow was replaced by a gas mixture comprising hydrogen and nitrogen in a mole ratio of 3:1. This mixture was at a feed rate of 3,000 volumes of gas feed per volume of catalyst per hour. A temperature of 400° C. and a pressure of 50 atmospheres was maintained during this run. The products from the reaction were trapped in a solution of sulphuric acid with a known concentration. After a certain period the acidic solution was analyzed. An absolute yield of 10.7% was obtained which represents about 67% of the theoretical equilibrium conversion at the above conditions.

EXAMPLE 3

Table I shows the absolute yields that are possible with the catalysts of the present invention. Each catalyst has been prepared by the method of Example 1 and is described in terms of the metal of the solutions with which it was doped, the numbers indicating the percent, by weight of the support of that component. The support material is activated carbon prepared as in Example 1, the bracketed number indicating the charring temperature. Topsoe, a commercial catalyst composed of at least 85% iron, has been included for comparison. The results of Table I show that the present catalysts can give satisfactory yields in the synthesis of ammonia at moderate pressures and temperatures.

TABLE I

| Catalyst | | | | | Temp. (°C) | Press (atm) | Space* Velocity | Mole Ratio N₂/H₂ of ⅓ % $Y_{abs}$ | % Eff. |
|---|---|---|---|---|---|---|---|---|---|
| Topsoe | | | | | 400 | 1 | 3000 | $10^{-3}$ | 0.24 |
| | | | | | 400 | 27 | 3000 | 3.1 | 32.4 |
| | | | | | 400 | 50 | 3000 | 5.9 | 37.1 |
| | | | | | 510 | 150 | 20000 | 12 | 82.7 |
| C(800) | Ba 2 | Ru 4 | K 12 | | 400 | 1 | 3000 | 0.3 | 72 |
| | | | | | 400 | 50 | 7500 | 6.9 | 43 |
| | | | | | 400 | 68 | 7500 | 8.1 | 40 |
| | | | | | 420 | 27 | 7500 | 7.4 | 98 |
| | | | | | 420 | 50 | 7500 | 10.3 | 82 |
| | | | | | 420 | 68 | 7500 | 11.8 | 73 |
| C(600) | Ba 4 | Al 1 | Ru 4 | K 14 | 375 | 50 | 3000 | 7.4 | 36 |
| | | | | | 400 | 27 | 3000 | 7.8 | 81 |
| | | | | | 400 | 50 | 3000 | 10.7 | 67 |
| C(600) | Ba 4 | La 2 | Ru 4 | K 12 | 400 | 27 | 3000 | 7.3 | 76 |
| | | | | | 400 | 50 | 3000 | 10.7 | 67 |
| C(600) | Ba 4 | La 1 | Ru 4 | K 14 | 400 | 27 | 3000 | 8.0 | 84 |
| | | | | | 400 | 68 | 7500 | 9.6 | 47 |
| | | | | | 420 | 68 | 7500 | 12.6 | 78 |
| C(800) | Ba 4 | La 1 | Ru 4 | K 14 | 400 | 27 | 3000 | 9.1 | 95 |
| | | | | | 400 | 50 | 3000 | 13.7 | 86 |
| | | | | | 400 | 68 | 30000 | 14.3 | 71 |
| | | | | | 420 | 27 | 3000 | 7.5 | 100 |
| | | | | | 420 | 50 | 3000 | 12.5 | 100 |
| | | | | | 420 | 68 | 3000 | 14.5 | 90 |
| | | | | | 420 | 27 | 6000 | 7.4 | 98 |
| | | | | | 420 | 50 | 6000 | 11.9 | 95 |
| | | | | | 420 | 68 | 6000 | 14.6 | 92 |
| C(800) | Ba 2 | La 2 | Ru 4 | K 12 | 400 | 27 | 3000 | 7.0 | 73 |
| | | | | | 400 | 50 | 3000 | 10.9 | 69 |
| C(800) | Ba 4 | La 4 | Ru 1 | K 14 | 400 | 27 | 3000 | 6.5 | 68 |
| | | | | | 400 | 50 | 3000 | 8.3 | 53 |
| | | | | | 420 | 50 | 3000 | 11.7 | 94 |
| | | | | | 420 | 68 | 3000 | 12.5 | 78 |
| C(600) | Ba 4 | Mg 2 | Ru 3 | K 15 | 400 | 50 | 2000 | 5.5 | 35 |
| C(800) | Ba 4 | La 2 | Al 1 | Ru 4 K 14 | 400 | 27 | 6000 | 3.4 | 35 |
| | | | | | 400 | 50 | 6000 | 4.2 | 26 |
| C(800) | Ba 4 | La 4 | Mn 4 | Ru Cs 0.5 14 | 400 | 27 | 3000 | 2.7 | 28 |

*Volumes of gas feed per volume of catalyst per hour

Most active carbon-based catalysts for nitrogen fixation readily sinter at high temperatures and, subsequently, lose their activity. Without being bound by the same, we believe that the longevity of the catalysts of the present invention is partially due to their resistance to sintering. This resistance is acquired during the doping procedure. The treatment, under vacuum, of sequentially doping the support material with each ion and heating between dopings appears to be beneficial. Catalysts which did not undergo this treatment were inferior in activity and longevity.

At identical reaction conditions, the activity of the commercial iron catalyst dropped with time for no apparent reason while the activity of the catalysts of the present invention remained steady and showed no signs of deterioration.

EXAMPLE 4

Table II displays the variation in yield of ammonia with different support materials. These yields were determined for the synthesis of ammonia at 400° C. and 400 psi at a flow rate of 100 ml./hour.

TABLE II

| | | | | 400° C., 27 atm. | | |
|---|---|---|---|---|---|---|
| Catalyst | | | | Mole Ratio N₂/H₂ | Space Velocity | Yield (mM nH₃) |
| Topsoe | | | | 1/3 | 3000 | 225 |
| PVC char | Ru 4 | K 8 | | 7/3 | 3000 | 96 |
| Coconut char | Ba 2 | Ru 4 | K 12 | 1/3 | 3000 | 450 |
| Maple char (800) | Ba 2 | Ru 4 | K 12 | 1/3 | 3000 | 370 |
| Cellulose (600) | Ba 2 | Ru 4 | K 12 | 1/3 | 3000 | 310 |

Both polyvinyledene chloride and cellulose were pelletized prior to charring. The chars were prepared as in Example 1 for the hardwood with the exception that since the polyvinyledene chloride pellets swell in a nitrogen atmosphere these were charred under vacuum.

EXAMPLE 5

This example shows that the charring temperature used, in the preparation of active carbon to be used as a support material, affects the efficiency of the catalyst. This is demonstrated in Table III based on catalysts prepared in accordance with Example 1 except as set forth in the Table:

TABLE III

| Catalyst | | | | Mole Ratio $N_2/H_2$ | Temp. (°C) | Press (atm) | Space Velocity | % $Y_{abs}$ | % Eff. |
|---|---|---|---|---|---|---|---|---|---|
| C(600) | Ba 2 | Ru 4 | K 12 | ⅓ | 400 | 27 | 3000 | 6.5 | 68 |
| | | | | ⅓ | 400 | 50 | 3000 | 9.6 | 60 |
| C(800) | Ba 2 | Ru 4 | K 12 | ⅓ | 400 | 27 | 3000 | 7.1 | 74 |
| | | | | ⅓ | 400 | 50 | 3000 | 11.7 | 74 |

EXAMPLE 6

Table IV shows that the sequence of doping affects the yield of ammonia. The preferred sequence of doping for the three components that are shown, is first a barium-containing solution, then one with ruthenium and, lastly, one with potassium. It seems that the barium salt prepares the surface of the support for the adsorption of ruthenium and that the high basicity of the last doping component, potassium, enhances catalytic activity.

The solutions which were used in this example were of barium nitrate, ruthenium chloride trihydrate and potassium hydroxide.

TABLE IV

| Catalyst C(600) | | | Mole Ratio $N_2/H_2$ | Temp. (°C) | Press. (atm.) | Space Velocity | Yield (mM of $NH_3$) |
|---|---|---|---|---|---|---|---|
| Ba 12 | K 2 | Ru 4 | ⅓ | 400 | 27 | 3000 | 25 |
| K 4 | Ba 2 | Ru 12 | ⅓ | 400 | 27 | 3000 | 45 |
| Ru 2 | Ba 12 | K 4 | ⅓ | 400 | 27 | 3000 | 93 |
| Ba 2 | Ru 4 | K 12 | ⅓ | 400 | 27 | 3000 | 360 |

EXAMPLE 7

The efficiency of a given catalyst may be optimized by careful selection of the reaction conditions. Examination of Table I shows that the yield and efficiency of a given catalyst vary with temperature, pressure and gas feed rate at a constant gas feed composition. Table V shows the effect of varying the mole ratio of $N_2/H_2$ in the feed gas stream at a given temperature, pressure at gas feed rate.

TABLE V

| C(600) Ba La Ru K at 400° C. |
| 4 1 4 14 |
| 68 atm space velocity of 9000 |

| Mole Ratio $N_2/H_2$ | % $Y_{abs}$ | % Eff. |
|---|---|---|
| 1/3 | 8.5 | 42 |
| 3/2 | 7.3 | 67 |
| 1/1 | 11.1 | 78 |

EXAMPLE 8

Generally, a catalyst for nitrogen fixation is less prone to carbon monoxide poisoning at high temperatures. However, the equilibrium yields of ammonia decrease as the reaction temperature is increased; the yield may be raised by increasing the reaction pressure, a measure which also causes carbon monoxide poisoning to become more pronounced. For example, a commercial iron catalyst at 450° C. and 100 atmospheres displays a drop of 84% in the yield of ammonia when 0.08% carbon monoxide is introduced into the feed gas stream, and a drop of 65% with 0.04% carbon monoxide. At an increased temperature of 500° C., the yields drop less drastically by 45% and 15%, respectively.

The catalyst of the present invention displayed a 68% decrease in yield at 420° C. and 70 atmospheres when 1.0 % carbon monoxide was added to the feed gas stream, and a 23% decrease in the presence of 0.1% carbon monoxide. Moreover, the catalysts of the present invention regained their activity when carbon monoxide was eliminated from the feed gas stream even after prolonged periods of its addition. Carbon monoxide acts as a temporary inhibitor, rather than a poisoning agent, for the catalysts of the present invention, while exposure of the commercial iron catalyst to carbon monoxide results in permanent injury.

The present family of catalysts is suitable for use in ammonia synthesis and is operative at lower reaction temperatures and lower pressures to produce similar yields as the iron catalyst of the existing art.

EXAMPLE 9

The present family of catalysts can also be used in Fischer-Tropsch reactions, as demonstrated by the following example.

Carbon monoxide and hydrogen in the ratio of 1:2 were reacted at a pressure of 300 psi and a temperature of 250° C. over C(600) Ba Ru K, a catalyst of the present invention. The reaction produced methane, 22%; hydrocarbons ($C_2$-$C_{18}$), 5% and carbon dioxide, 18%.

In a similar experiment at 300° C., the reaction products were comprised of methane, 64%; hydrocarbons ($C_2$-$C_{18}$), 7%; carbon dioxide, 19% and alcohols ($C_1$-$C_4$), approximately 1%.

The embodiments of the invention in which an exclusive property or privilege is claimed are defined as follows:

1. A method for preparing a transition metal catalyst comprising:
    doping an activated carbon support material with, in sequence, a solution of an alkaline earth metal compound, a solution of a compound of a transition metal from Group VIII, and a solution of an alkali metal compound.

2. A method for preparing a transition metal catalyst as set forth in claim 1 comprising:
    drying and baking the product after doping with each and every solution.

3. A transition metal catalyst comprising an activated carbon support material associated with compounds of an alkaline earth metal, a transition metal from Group VIII, and an alkali metal prepared according to the process of claim 1.

4. A transition metal catalyst as set forth in claim 3 wherein the support material is additionally doped with one or both of (a) a compound of lanthanide metal, and (b) a compound of a Group IIIA metal.

5. The method as set forth in claim 1 wherein:

the alkaline earth metal is barium; the transition metal is ruthenium; and the alkali earth metal is potassium.

6. The method as set forth in claim 5 wherein: the product from the first doping step is doped with an aqueous solution of a compound of a Group III A metal.

7. The method as set forth in claim 5 wherein: the product from the first doping step is doped with an aqueous solution of a compound of a lanthanide metal before being doped with the transition metal compound.

8. The method as set forth in claim 5 wherein: the barium is provided in an amount between 1% and 8% by weight of the support; the ruthenium is provided in an amount between 0.1% and 4% by weight of the support; and the potassium is provided in an amount between 5% and 20% by weight of the support.

9. The method as set forth in claim 8 wherein: the lanthanide metal is provided in an amount between 0.5% and 6% by weight of the support, expressed as an equivalent amount of lanthanum.

10. The method as set forth in claim 8 wherein: the Group III A metal is aluminum and is provided in an amount between 0.5% and 5% by weight of the support, expressed as an equivalent of aluminum.

11. The method as set forth in claim 1 wherein: the product from the first doping step is doped with an aqueous solution of a compound of a lanthanide metal before being doped with the transition metal compound.

12. The method as set forth in claim 1 wherein: the product from the first doping step is doped with an aqueous solution of a compound of a Group III A metal.

13. The method as set forth in claim 2 wherein: the alkaline earth metal compound is a salt; the transition metal compound is a salt; and the alkali metal compound is a salt or hydroxide.

14. The method as set forth in claim 13 wherein: the drying and baking steps are performed under vacuum.

15. The method as set forth in claim 14 wherein: the doping steps are performed under vacuum.

16. The method as set forth in claim 13 wherein: the alkaline earth metal is barium; the transition metal is ruthenium; and the alkali earth metal is potassium.

17. The method as set forth in claim 15 wherein: the alkaline earth metal is barium; the transition metal is ruthenium; and the alkali earth metal is potassium.

18. The method as set forth in claim 16 wherein: the barium is provided in an amount between 1% and 8% by weight of the support; the ruthenium is provided in an amount between 0.1% and 4% by weight of the support; and the potassium is provided in an amount between 5% and 20% by weight of the support.

19. The method as set forth in claim 17 wherein: the barium is provided in an amount between 1% and 8% by weight of the support; the ruthenium is provided in an amount between 0.1% and 4% by weight of the support; and the potassium is provided in an amount between 5% and 20% by weight of the support.

20. The method as set forth in claim 16 wherein: the product from the first doping step is doped with an aqueous solution of a compound of a lanthanide metal before being doped with the transition metal compound.

21. The method as set forth in claim 17 wherein: the product from the first doping step is doped with an aqueous solution of a compound of a lanthanide metal before being doped with the transition metal compound.

22. The method as set forth in claim 16 wherein: the product from the first doping step is doped with an aqueous solution of a compound of a Group III A metal.

23. The method as set forth in claim 17 wherein: the product from the first doping step is doped with an aqueous solution of a compound of a Group III A metal.

* * * * *